(12) United States Patent
Torikai et al.

(10) Patent No.: US 8,024,350 B2
(45) Date of Patent: Sep. 20, 2011

(54) STREAM DATA PROCESSING CONTROL METHOD, STREAM DATA PROCESSING APPARATUS, AND STREAM DATA PROCESSING CONTROL PROGRAM

(75) Inventors: Satoshi Torikai, Yokohama (JP); Shinichi Tanaka, Yokohama (JP); Itaru Nishizawa, Koganei (JP); Tsuneyuki Imaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 304 days.

(21) Appl. No.: 12/457,577

(22) Filed: Jun. 16, 2009

(65) Prior Publication Data

US 2010/0138438 A1   Jun. 3, 2010

(30) Foreign Application Priority Data

Dec. 3, 2008 (JP) .................................. 2008-308463

(51) Int. Cl.
   *G06F 17/30* (2006.01)
(52) U.S. Cl. ......... 707/769; 707/781; 707/796; 707/803
(58) Field of Classification Search .................. 707/694, 707/702, 736, 769, 781, 792, 795, 796, 803
   See application file for complete search history.

(56) References Cited

U.S. PATENT DOCUMENTS

| | | | | |
|---|---|---|---|---|
| 7,403,959 B2* | 7/2008 | Nishizawa et al. | .................. | 1/1 |
| 7,673,065 B2* | 3/2010 | Srinivasan et al. | ............ | 709/231 |
| 2006/0277230 A1 | 12/2006 | Nishizawa et al. | | |
| 2007/0226239 A1* | 9/2007 | Johnson et al. | ................ | 707/101 |
| 2008/0255847 A1 | 10/2008 | Moriwaki et al. | | |
| 2009/0313614 A1* | 12/2009 | Andrade et al. | ............... | 717/151 |

FOREIGN PATENT DOCUMENTS

| | | |
|---|---|---|
| JP | 2003-298661 | 4/2002 |
| JP | 2006-338432 | 6/2005 |
| JP | 2006-338432 | 12/2006 |
| JP | 2008-262046 | 10/2008 |

OTHER PUBLICATIONS

Rajeev Motwani et al., "Query Processing, Resource Management, and Approximation in a Data Stream Management System", Proceedings of the 2003 CIDR Conference, 12 pages.
Office Action from Japanese Patent Office, mail date Sep. 7, 2010.

* cited by examiner

*Primary Examiner* — Cam-Linh Nguyen
(74) *Attorney, Agent, or Firm* — Stites Harbison PLLC; Juan Carlos A. Marquez, Esq.

(57) ABSTRACT

Provided is a stream data processing control method of controlling a stream data processing apparatus for receiving data added with time information in time series, and processing the data with a registered query therein, the stream data processing apparatus including the query for processing the data, a window in which the received data is stored, and control management information including a control code for identifying the content of the controlling, the method including the steps of: creating data including the control code based on the control management information; determining whether or not the data stored in the window includes the control code in a case where the received data is stored in the window; and controlling the stream data processing apparatus based on the control code included in the data if the data stored in the window includes the control code.

14 Claims, 15 Drawing Sheets

CONTROL MANAGEMENT TABLE   119

| CONTROL CODE | CONTROL TIME | CONTROL TYPE | OPTION 1 | OPTION 2 |
|---|---|---|---|---|
| 1 | 10:00 | CHANGE | Q1 | Q2 |
| 2 | 11:00 | START MONITOR | Q2 | |
| 3 | 12:00 | STOP MONITOR | Q2 | |
| 4 | 17:00 | SHUTDOWN | | |

502   503   504   505   506

```
register query Q1
IStream (
         SELECT SUM(output)
         FROM sensor [rows 2]
);
```
~ 301

FIG.3A

```
register query Q2
IStream (
         SELECT MAX(output)
         FROM sensor [rows 2]
);
```
~ 302

FIG.3B start query Q1; ~401

*FIG.4A* change query from Q1 to Q2; ~402

*FIG.4B* start monitor Q2; ~403

*FIG.4C* stop monitor Q2; ~404

*FIG.4D* shutdown; ~405

*FIG.4E* start query Q1;
change query from Q1 to Q2 at 10:00;
start monitor Q2 at 11:00;
stop monitor Q2 at 12:00;
shutdown at 17:00;
~406

*FIG.4F*

CONTROL MANAGEMENT TABLE 119

| CONTROL CODE | CONTROL TIME | CONTROL TYPE | OPTION 1 | OPTION 2 |
|---|---|---|---|---|
| 1 | 10:00 | CHANGE | Q1 | Q2 |
| 2 | 11:00 | START MONITOR | Q2 | |
| 3 | 12:00 | STOP MONITOR | Q2 | |
| 4 | 17:00 | SHUTDOWN | | |

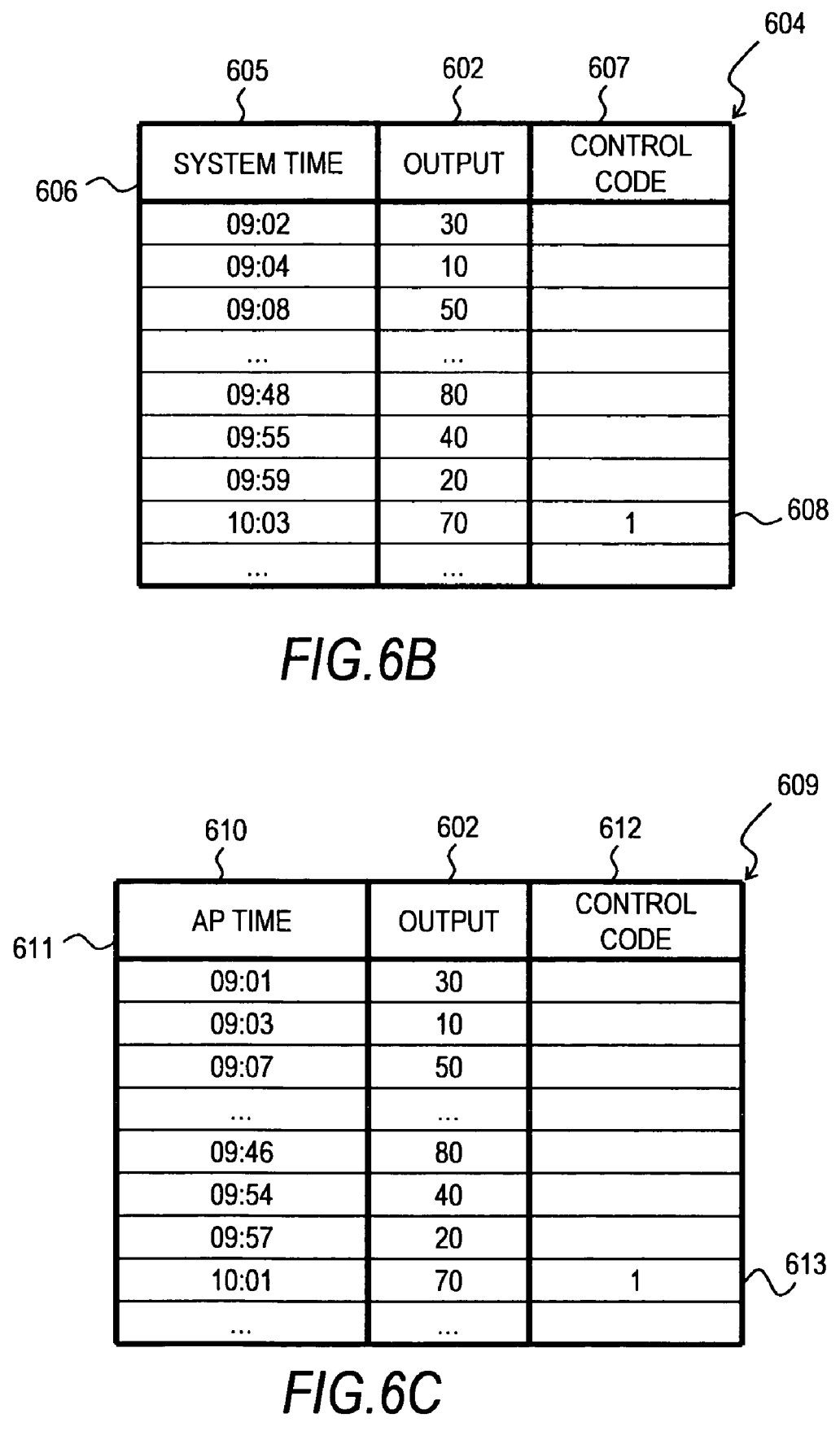

| SYSTEM TIME | OUTPUT | CONTROL CODE |
|---|---|---|
| 09:02 | 30 | |
| 09:04 | 10 | |
| 09:08 | 50 | |
| ... | ... | |
| 09:48 | 80 | |
| 09:55 | 40 | |
| 09:59 | 20 | |
| 10:03 | 70 | 1 |
| ... | ... | |

FIG.6C

| AP TIME | OUTPUT | CONTROL CODE |
|---|---|---|
| 09:01 | 30 | |
| 09:03 | 10 | |
| 09:07 | 50 | |
| ... | ... | |
| 09:46 | 80 | |
| 09:54 | 40 | |
| 09:57 | 20 | |
| 10:01 | 70 | 1 |
| ... | ... | |

| SYSTEM TIME | OUTPUT | CONTROL CODE |
|---|---|---|
| 09:02 | 30 | |
| 09:04 | 10 | |
| 09:08 | 50 | |
| ... | ... | |
| 09:48 | 80 | |
| 09:55 | 40 | |
| 09:59 | 20 | |
| | | 1 |
| 10:03 | 70 | |
| ... | ... | |

FIG.13A

| AP TIME | OUTPUT | CONTROL CODE |
|---|---|---|
| 09:01 | 30 | |
| 09:03 | 10 | |
| 09:07 | 50 | |
| ... | ... | |
| 09:46 | 80 | |
| 09:54 | 40 | |
| 09:57 | 20 | |
| | | 1 |
| 10:01 | 70 | |
| ... | ... | |

FIG.13B

STREAM DATA PROCESSING CONTROL METHOD, STREAM DATA PROCESSING APPARATUS, AND STREAM DATA PROCESSING CONTROL PROGRAM

CLAIM OF PRIORITY

The present application claims priority from Japanese patent application JP 2008-308463 filed on Dec. 3, 2008, the content of which is hereby incorporated by reference into this application.

BACKGROUND OF THE INVENTION

This invention relates to a technology of controlling a stream data processing system.

In recent years, there have been growing demands for a stream data processing system for receiving a large amount of data (stream data) arriving continuously, and processing the stream data in real time. For example, in a financial application for aiding stock trading, it is one of the most important tasks to promptly respond to a stock price change. When data is processed with a conventional database management system (DBMS), it has been necessary to temporarily store received stock market data in a storage device. In future, when a larger amount of stock market data is processed, it may be difficult to respond in real time to a stock price change or the like.

Individual creation of an application for processing stream data in real time leads to such problems as an elongated development period, higher development cost, and a difficulty encountered in promptly responding to a change in a task using the application. As a result, a versatile stream data processing system is in demand.

In a stream data processing system, a query is registered first, and continuously executed upon arrival of stream data. However, the stream data arrives continuously, and hence it is impossible to start a processing after waiting the arrival of all data items. In addition, the data items that have arrived at the system need to be processed in the order of arrival without being affected by the load of data processing.

In the technology disclosed in R. Motwani, J. Widom, A. Arasu, B. Babcock, S. Babu, M. Datar, G. Manku, C. Olston, J. Rosenstein, and R. Varma, "Query Processing, Resource Management, and Approximation in a Data Stream Management System", In Proc. of the 2003 Conf. on Innovative Data Systems Research (CIDR), January 2003, there is introduced a notion called sliding window (hereinafter referred to as "window") to implement a real-time processing while cutting out a part of the stream data by specifying a time range such as the last 10 minutes or a number range such as the latest 1,000 data items.

As a language for describing a query for obtaining data, continuous query language (CQL) capable of specifying a window is disclosed in above-described "Query Processing, Resource Management, and Approximation in a Data Stream Management System". The CQL is an extended version of structured query language (SQL) which is used widely in the DBMS, and is capable of specifying a window. A technology of specifically using the CQL or the like is disclosed in, e.g., JP 2006-338432 A.

However, the stream data arrives continuously, and thus, even when the processing behavior of the stream data processing system is to be changed based on the received data, it is impossible to specify data serving as a delimiter. On the other hand, a transmitter of the stream data, e.g., a stream data transmitting application recognizes data serving as a delimiter. Accordingly, as a technology for recognizing a delimiter of the stream data, a technology of determining a target of a processing (decode processing) via a packet filter based on packet identifiers added to packets forming the stream data (image according to MPEG or the like) is disclosed in JP 2003-298661 A.

SUMMARY OF THE INVENTION

However, the technology disclosed in JP 2003-298661 A is applicable only to the case where there is always a unique output processing result for each of the packets forming the input stream data, and a processing can be executed independently for each of the packets based on the packet identifier. However, in a stream data processing system having such a window mechanism as disclosed in above-described "Query Processing, Resource Management, and Approximation in a Data Stream Management System", tuples in a window cannot be processed independently on a tuple-by-tuple basis based on a relation such as the number of survivors. Therefore, the problem described above cannot be solved by the technology disclosed in JP 2003-298661 A.

In a stream data processing system used in a real-time application, it is necessary for the real-time application to recognize a change in control of a stream data processing, such as a query change and acquisition of performance information in a specified interval.

An object of this invention is to implement a technology of allowing a real-time application to determine a change in control of a stream data processing.

The representative aspects of this invention are as follows. That is, there is provided a stream data processing control method of controlling a stream data processing apparatus for receiving data added with time information in time series, and processing the data with a registered query therein, the stream data processing apparatus including: an interface for receiving the data; a processor coupled to the interface; and a memory device coupled to the processor, for storing therein the query for processing the data, a window in which the received data is stored in a case where the received data is processed by the query, and control management information including a content of the controlling of the stream data processing apparatus and a control code for identifying the content of the controlling, the stream data processing control method including the steps of: creating, by the stream data processing apparatus, data including the control code based on the control management information in a case where the data is received; determining, by the stream data processing apparatus, whether or not the data stored in the window includes the control code in a case where the received data is stored in the window; and controlling the stream data processing apparatus based on the control code included in the data if the data stored in the window includes the control code.

According to an embodiment of this invention, it becomes possible to allow a real-time application to determine a change in control of a stream data processing based on a control code added to stream data.

BRIEF DESCRIPTION OF THE DRAWINGS

The present invention can be appreciated by the description which follows in conjunction with the following figures, wherein:

FIG. 3A is a diagram illustrating a query executed in the stream data processing system according to the embodiment of this invention;

FIG. 3B is a diagram illustrating a query executed in the stream data processing system according to the embodiment of this invention;

FIGS. 4A to 4E are diagrams illustrating an example of commands (each with no time specification) input to the stream data processing system according to the embodiment of this invention;

FIG. 4F is a diagram illustrating an example of a command (with a time specification) input to the stream data processing system according to the embodiment of this invention;

FIG. 6B illustrates an example of a stream tuple created based on received stream data according to the embodiment of this invention;

FIG. 6C illustrates another example of a stream tuple created based on received stream data according to the embodiment of this invention;

FIG. 13A is a diagram illustrating an example of a stream tuple processed by the stream data processing system according to a variation of the embodiment of this invention;

FIG. 13B is a diagram illustrating an example of a stream tuple processed by the stream data processing system according to the variation of the embodiment of this invention;

DETAILED DESCRIPTION OF THE PREFERRED EMBODIMENTS

Figure 1:
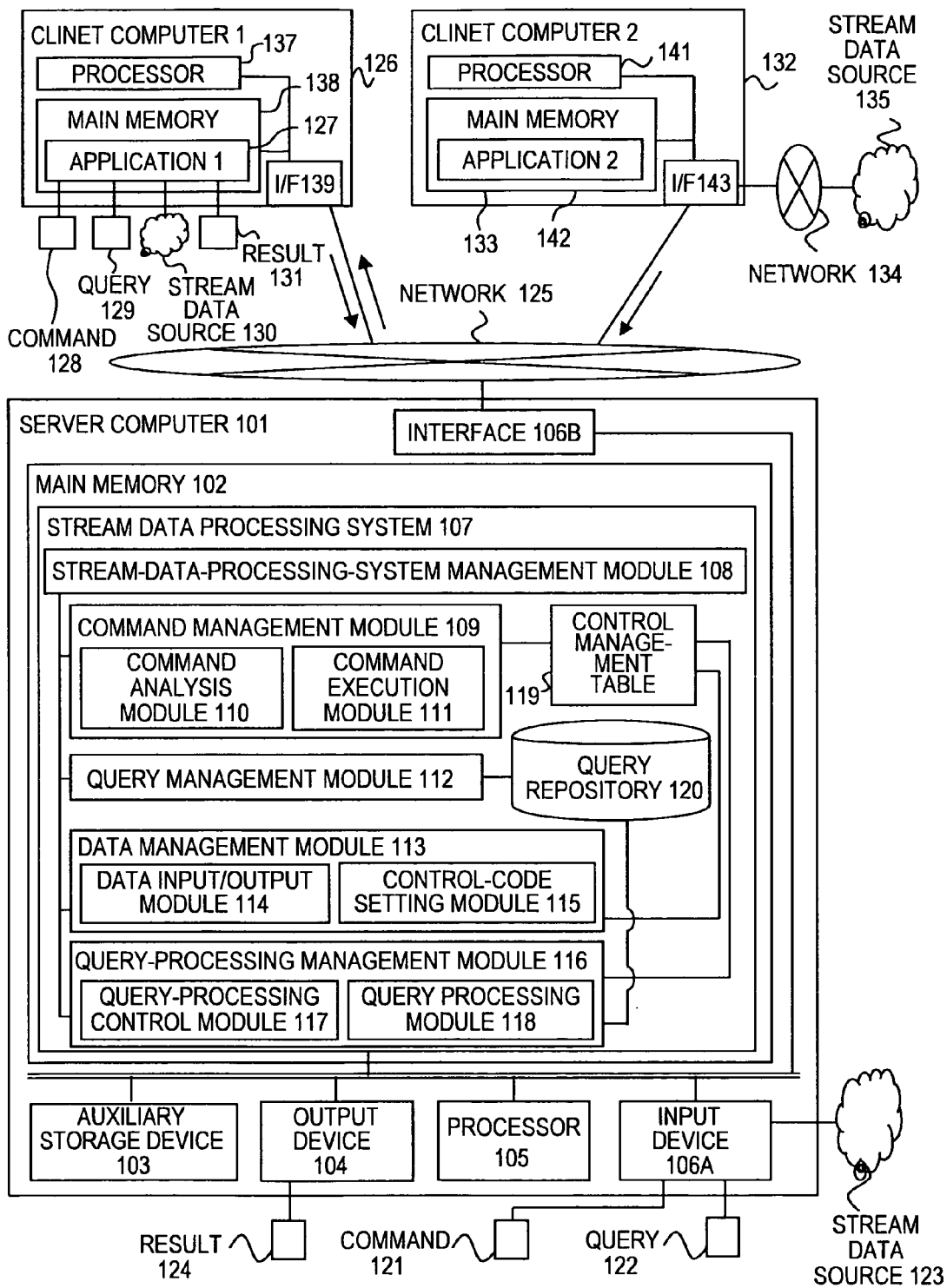
FIG. 1 is a diagram illustrating an example of a computer system including a stream data processing system according to an embodiment of this invention.

FIG. 1 is a diagram illustrating an example of a computer system including a stream data processing system according to an embodiment of this invention.

The computer system according to the embodiment of this invention contains a server computer 101. The server computer 101 receives stream data arriving continuously, and processes the received stream data.

A stream data processing system 107 is implemented as a program which processes stream data and is executed on the server computer 101. Alternatively, the stream data processing system 107 may also be implemented as dedicated hardware mounted on the server computer 101.

The server computer 101 includes a main memory 102, an auxiliary storage device 103, an output device 104, a processor 105, an input device 106A, and an interface 106B. The server computer 101 may also be a computer system such as, e.g., a blade computer system or a PC server.

The main memory 102 stores therein a program executed by the processor 105, and data necessary for executing the program. For example, the main memory 102 is a volatile storage medium accessible at high speed.

In the main memory 102, the stream data processing system 107 for processing stream data is stored. The stream data processing system 107 is executed by the processor 105 to cooperate with each component of the server computer 101 and process the stream data. Details of the stream data processing system 107 are described later.

The auxiliary storage device 103 stores therein the program executed in the server computer 101, data, and the like. In the auxiliary storage device 103, e.g., the stream data received by the server computer 101 is stored. The auxiliary storage device 103 may also be an external storage device coupled via a network or the like.

The output device 104 outputs a result 124 processed by the stream data processing system 107. The output device 104 also outputs management information of the server computer 101 and the like. For example, the output device 104 is a display which displays information.

The processor 105 executes various processings by processing the program stored in the main memory 102.

The input device 106A receives input of a query 122 to be executed in the stream data processing system 107. The input device 106A also receives input of a command 121 for controlling the server computer 101 or the stream data processing system 107. The input device 106A is further capable of directly receiving input of stream data from a stream data source 123. The interface 106B is coupled to a network 125.

The server computer 101 is coupled to a client computer which transmits stream data. In the computer system illustrated in FIG. 1, a client computer 1 (126) and a client computer 2 (132) are coupled to the server computer 101 which executes the stream data processing system 107 via the network 125.

The network 125 may also be the Ethernet (registered trademark), a local area network (LAN) coupled by an optical fiber or the like, or a wide area network (WAN) including the Internet which is lower in speed than the LAN. The client computer (126 or 132) may be any computer system such as a personal computer or a blade computer system.

The client computer 1 (126) includes a processor 137, a main memory 138, and an interface (I/F) 139. In the main memory 138, an application 1 (127) executed by the processor 137 is stored. The application 1 (127) receives input of a command 128 and a query 129, and transmits the input to the server computer 101. The application 1 (127) further transmits the stream data input from the stream data source 130 from the network 125 to the server computer 101 via the I/F 139. The application 1 (127) also receives a result of the stream data processed by the server computer 101, and outputs a result 131.

The client computer 2 (132) includes a processor 141, a main memory 142, and an I/F 143. In the main memory 142, an application 2 (133) executed by the processor 141 is stored. In the application 2 (133), the client computer 2 (132) receives, from a network 134, the stream data from a stream data source 135 via the I/F 143, and transmits the stream data from the network 125 to the server computer 101 via the I/F 143.

As described above, the server computer 101 may directly receive the stream data or receive the stream data via the client computer. Besides the above-mentioned stock price delivery information in the financial application, examples of the received stream data include POS data in retailing, probe car information in a traffic information system, and an error log in computer system management.

Hereinbelow, a configuration of the stream data processing system 107 is described. The stream data processing system 107 includes a stream-data-processing-system management module 108, a command management module 109, a query management module 112, a data management module 113, a query-processing management module 116, a control management table 119, and a query repository 120.

The stream data processing system 107 is managed by the stream-data-processing-system management module 108.

The command management module 109 processes the command 121 for controlling the stream data processing system which has been input via the input device 106A. The command management module 109 includes a command analysis module 110 and a command execution module 111.

The command analysis module 110 syntactically analyzes the input command 121. The command execution module 111 registers, based on the result of analyzing the command 121, control information in the control management table 119. In the control management table 119, control information and the content of control are stored. Details of the control command table 119 are described later with reference to FIG. 5.

A command to be processed by the command management module 109 may be the command 121 directly input to the server computer 101, or the command 128 input to the client computer 1 (126) and then input to the server computer 101 via the network 125.

The query management module 112 syntactically analyzes the query 122 input via the input device 106A. The query management module 112 further optimizes the analyzed query to create an execution form. Finally, the query management module 112 stores the created query execution form in the query repository 120. The query repository 120 may be held in the main memory 102 of the server computer 101, or stored in the auxiliary storage device 103 provided in the server computer 101.

A query to be processed by the query management module 112 may be the query 122 directly input to the server computer 101, or the query 129 input to the client computer 1 (126) and then input to the server computer 101 via the network 125.

The data management module 113 processes the stream data input via the input device 106A. The data management module 113 includes a data input/output module 114 and a control-code setting module 115.

The data input/output module 114 stores the input stream data in a stream-data input queue. The control-code setting module 115 sets the control information registered in the control management table 119 to the stream data stored in the stream-data input queue.

The query-processing management module 116 includes a query-processing control module 117 and a query processing module 118. The query-processing control module 117 controls a query processing based on the control information added to the input stream data to be processed and on the content of control registered in the control management table 119. The query processing module 118 processes the input stream data to be processed based on the query execution form stored in the query repository 120.

The result of processing the query is stored in the stream data output queue by the data input/output module 114, and further output as the result 124 via the output device 104. The result of the query processing may also be output directly from the stream data processing system 107 of the server computer 101, or output as a result 131 from the client computer 1 (126) via the network 125.

For a method of storing the stream data within the stream data processing system, the analysis and optimization of the received query, a method of registering the created query execution form, or the like, the technology disclosed in JP 2006-338432 A may be used.

The stream data targeted according to the embodiment of this invention arrives continuously, and includes a large number of data items, but the amount of data in each item is relatively small, and each data item is logically independent. According to the embodiment of this invention, in order to process such stream data, the query is processed based on the notion of the window, as described above.

The stream data is not staticized data such as a table processed in the DBMS, but is seamless stream data, and thus it is impossible to process the stream data unless the unit of the stream data to be targeted is specified. Therefore, as described above, the notion of the sliding window (window) to cut out data by delimiting the stream data on the basis of a specified period or the specified number of data items is adopted. The window can be conceptualized as an arithmetic operation (window operation) for determining the lifetime (period as an operation target) of data. The lifetime of the stream data is specified by the window operation, and a stream tuple including one or more data values and timestamps is created.

Figure 2:
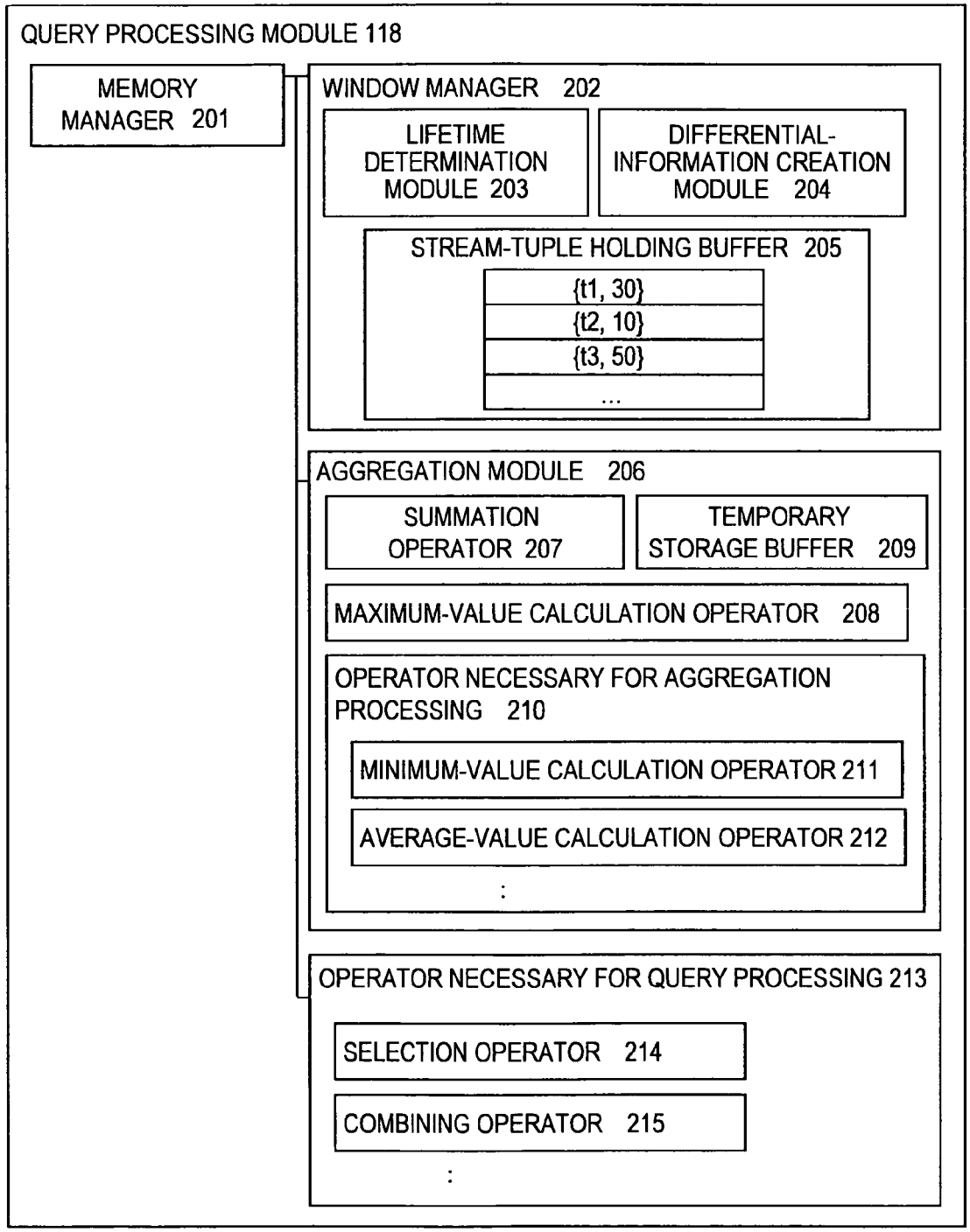
FIG. 2 is a block diagram illustrating an example of a configuration of a query processing module according to the embodiment of this invention.

FIG. 2 is a block diagram illustrating an example of a configuration of the query processing module 118 according to the embodiment of this invention.

The query processing module 118 includes a memory manager 201, a window manager 202, an aggregation module 206, and an operator 213 necessary for query processing.

The memory manager 201 manages the window manager 202, the aggregation module 206, and the operator 213 necessary for query processing.

The window manager 202 applies the window operation specified in the query to the stream data to create the stream tuple and set the lifetime of the stream tuple in the system. The time at which the stream data is inserted into the window corresponds to the starting time of the lifetime, and the time at which the stream data is erased from the window corresponds to the ending time of the lifetime.

The aggregation module 206 contains a summation operator 207, a maximum-value calculation operator 208, a temporary storage buffer 209, and an operator 210 necessary for aggregation processing. In the temporary storage buffer 209, the result of an aggregation executed by each of the operators is temporarily held.

The summation operator 207 calculates the sum of data within the window. The maximum-value calculation operator 208 calculates the maximum value of the data within the window. The operator 210 necessary for aggregation processing contains other operators necessary for aggregation processing. For example, the operator 210 contains a minimum-value calculation operator 211 for calculating a minimum value, and an average-value calculation operator 212 for calculating an average value.

Hereinbelow, the window manager 202 is described in greater detail. The window manager 202 includes a stream-tuple holding buffer 205, a lifetime determination module 203, and a differential-information creation module 204.

The window manager 202 receives input of the stream data, and creates the stream tuple. The window manager 202 further stores the created stream tuple in the stream-tuple holding buffer 205, and notifies the lifetime determination module 203.

The lifetime determination module 203 determines the lifetime of each stream tuple by the window operation, and deletes the stream tuple whose lifetime ends from the stream-tuple holding buffer 205.

The differential-information creation module 204 creates a plus tuple at a time when the stream tuple is stored in the stream-tuple holding buffer 205, and outputs the plus tuple as differential information. Likewise, the differential-information creation module 204 creates a minus tuple at a time when the stream tuple is erased from the stream-tuple holding buffer 205 (when the lifetime of the stream tuple ends), and similarly outputs the minus tuple as the differential information.

The stream-tuple holding buffer 205 and the temporary storage buffer 209 are allocated by the memory manager 201 in the query processing module 118 to the main memory 102 of the server computer 101. If a performance requirement and a reliability requirement are met, the stream-tuple holding buffer 205 or the temporary storage buffer 209 may also be allocated to the auxiliary storage device 103.

The operator 213 necessary for query processing contains a selection operator 214 for selecting data which satisfies a predetermined condition, a combining operator 215 for coupling data which satisfies a predetermined condition, and the like.

Hereinbelow, a method of controlling the stream data processing system according to the embodiment of this invention is described. First, prior to describing a specific procedure, queries and commands for obtaining data are illustrated. Further, control codes added to stream data are described with reference to specific examples.

FIG. 3A is a diagram illustrating a query 301 executed in the stream data processing system according to the embodiment of this invention.

The query 301 is for executing an aggregation processing involving the window operation. Specifically, the sum of values of an Output column in a sensor stream (identifier of stream data to be input) is calculated. The specified window is [rows 2], which indicates the window operation with respect to the latest two data items.

As a method of specifying a window, in addition to a Row window which specifies the width of the window in the number of data items, there is also a Range window for processing the stream data that has arrived within a specified time period. In the case of using the Range window, when [Range 10 minutes] is specified, e.g., data that has arrived in the last 10 minutes becomes a target of query processing.

FIG. 3B is a diagram illustrating a query 302 executed in the stream data processing system according to the embodiment of this invention.

The query 302 calculates the maximum value of the values of the Output column in the sensor stream. Input stream data and the like are the same as of the query 301 illustrated in FIG. 3A.

FIGS. 4A to 4E are diagrams illustrating an example of commands (each with no time specification) input to the stream data processing system according to the embodiment of this invention.

In a case where the commands 401 to 405 illustrated in FIG. 4A are input, a processing is immediately started according to the input commands.

A specific description is given to each of the commands. The command 401 is for starting a query Q1. The command 402 is for changing the currently executed query from the query Q1 to a query Q2. In other words, the command 402 is for ending the query Q1 and starting the query Q2.

The command 403 is for starting a monitor processing for obtaining performance information for the query Q2. The command 404 is for ending the monitor processing for obtaining performance information for the query Q2. The command 405 is for ending the stream data processing system.

FIG. 4F is a diagram illustrating an example of a command (with a time specification) input to the stream data processing system according to the embodiment of this invention.

In a case where a command 406 is input, the query Q1 is immediately started. At 10:00, the execution of the query Q1 is stopped, and the execution of the query Q2 is started. At 11:00, the monitor processing for obtaining performance information for the query Q2 is started. At 12:00, the monitor processing for obtaining performance information for the query Q2 is ended. At 17:00, the stream data processing system 107 is ended.

Figures 5, 6A:
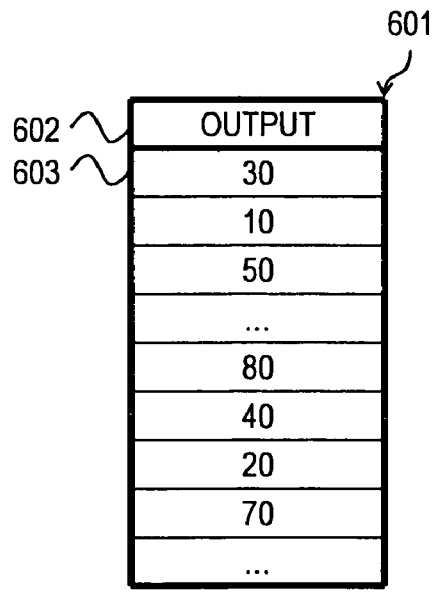
FIG. 5 is a diagram illustrating a specific example of a control management table according to the embodiment of this invention.
FIG. 6A is a diagram illustrating an example of a configuration of a stream data source input to a server computer according to the embodiment of this invention.

FIG. 5 is a diagram illustrating a specific example of the control management table 119 according to the embodiment of this invention.

The control management table 119 contains a control code 502, a control time 503, a control type 504, an option 1 (505), and an option 2 (506).

The control code 502 is for identifying control to be executed. The control time 503 is a time at which control is executed. The control type 504 indicates the type of control to be executed. The option 1 (505) and the option 2 (506) are optional information which supplements the control type, and are parameters used during the execution of a command or the like.

The control management table 119 illustrated in FIG. 5 corresponds to the command 406 illustrated in FIG. 4F. As described above, when the command 406 is input, the command 406 is analyzed by the command analysis module 110, and the result of the analysis is registered by the command execution module 111 in the control management table 119.

More specifically, with the command 406, the query Q1 is first executed with no time specification. In this case, a control code is added to the head stream data stored in the stream-data input queue, and registered in the control management table 119. A detailed description thereof is given with reference to FIGS. 7 to 9. When the query Q1 is executed, the corresponding record is deleted from the control management table 119. FIG. 5 illustrates a status after the execution of the query Q1 is started. In the case where there is no time specification, an immediate processing may also be executed based on the input command without adding a record to the control management table 119.

Subsequently, at 10:00, the execution of the query Q1 is stopped, and the execution of the query Q2 is started so that a Change command for switching the queries is executed. Corresponding to the Change command, a record in which the control code 502 is "1", the control time 503 is "10:00", the control type 504 is "Change", the option 1 is "Q1", and the option 2 is "Q2" is created.

Likewise, respective records corresponding to "Start Monitor" for starting the acquisition of performance information, "Stop Monitor" for ending the acquisition of performance information, and "Shutdown" for ending the stream data processing system 107 are created.

FIG. 6A is a diagram illustrating an example of a configuration of a stream data source input to the server computer 101 according to the embodiment of this invention.

The stream data source is a source of stream data to the server computer 101, and is actually a computer or the like. The stream data source 601 illustrated in FIG. 6A illustrates a list of data to be transmitted, which contains an Output column 602 for storing data therein. In the stream data source 601, data is stored in a time-series order, and stream data 603 having a value of 30 is transmitted first. The stream data may also include sets of a plurality of data values.

FIG. 6B illustrates an example of the stream tuple created based on the received stream data according to the embodiment of this invention.

The server computer 101 receives the stream data transmitted from the stream data source 601, and creates a stream tuple based on the time of reception. FIG. 6B illustrates an example of a system timestamp mode in which the time at which the stream data is received by the stream data processing system 107 is added as a timestamp.

A stream tuple 604 contains a System Time column 605, the Output column, and a control code column 607.

The System Time column 605 stores therein the time at which the server computer 101 has received stream data. For example, time information such as "09:02" (606) is set. The Output column stores therein the received stream data. To the control code column 607, the control code added in the control-code setting module 115 of the stream data processing system 107 is set. For example, "1" (608) is set.

FIG. 6C illustrates another example of the stream tuple created based on the received stream data according to the embodiment of this invention.

A stream tuple 609 illustrated in FIG. 6C is an example of an application timestamp mode in which the timestamp has been added to stream data by the application 1 (127) on the client computer 1 (126).

The stream tuple 609 contains an AP Time column 610, the Output column 602, and a control code column 612.

In the AP Time column 610, the timestamp added to data processed on the client computer is stored. For example, time information such as "09:01" (611) is set. The Output column stores therein the received stream data. To a control code column 612, the control code added in the control-code setting module 115 of the stream data processing system 107 is set. For example, "1" (613) is set.

The timestamp mode has been preset to the stream-data-processing-system management module 108, and one of the system timestamp mode and the application timestamp mode is set.

The foregoing is an example of the queries, the commands, the control management stable 119, and the stream data each used in the embodiment of this invention. Hereinbelow, a description is given of a specific processing of the stream data processing system 107 according to the embodiment of this invention. First, a procedure of creating the control management table 119 based on the input command 406 is described.

Figure 7:
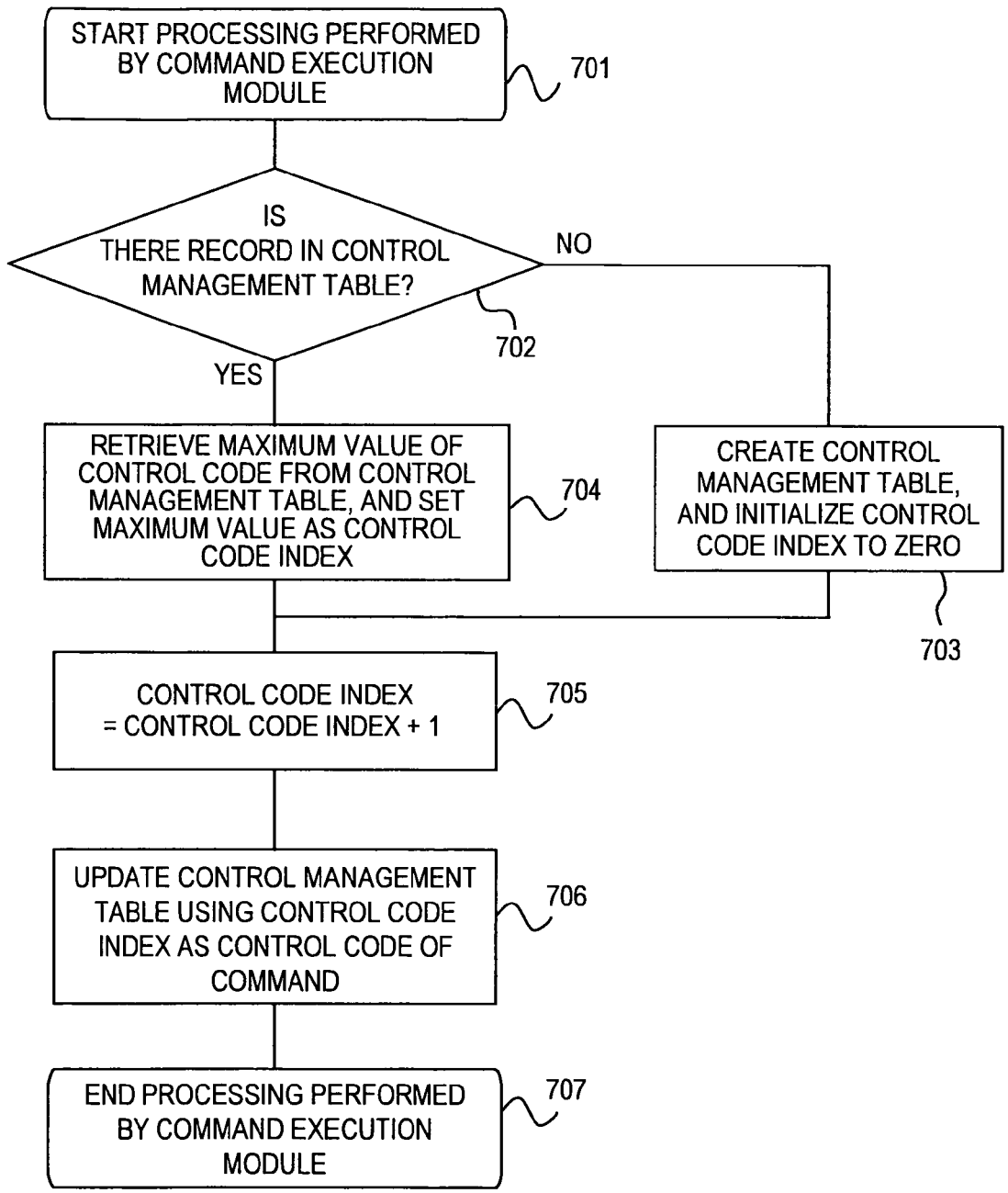
FIG. 7 is a flow chart illustrating a procedure of creating the control management table according to the embodiment of this invention.

FIG. 7 is a flow chart illustrating the procedure of creating the control management table 119 according to the embodiment of this invention.

In this processing, through the execution of the command execution module 111 by the processor 105, the control management table 119 is created based on the input command.

When the input command is analyzed by the command analysis module 110, the processor 105 starts a processing in the command execution module 111 (Step 701). This processing is executed in units in which the control codes are added based on the result of the analysis of the command by the command analysis module 110. For example, when the input command is the command 406 illustrated in FIG. 4F, the individual rows correspond thereto. At this time, for the first row with no time specification, it is unnecessary to specify the stream data whose processing is to be controlled. Therefore, the corresponding record need not be created in the control management table 119.

First, the processor 105 determines whether or not the control management table 119 is present (Step 702). Each of the records of the control management table 119 is deleted after the execution of the corresponding control.

In the case where the control management table 119 is not present (when the result of Step 702 is "No"), the processor 105 newly creates the control management table 119, and initializes a control code index to zero (Step 703).

Conversely, in the case where the control management table 119 is already present (when the result of Step 702 is "Yes"), the processor 105 retrieves the maximum value of the control code from the control management table 119, and sets the retrieved value as the control code index (Step 704).

Subsequently, the processor 105 adds 1 to the control code index (Step 705), and adds a record to the control management table 119 using the control code index of concern as the control code of a command as a processing target (Step 706). Thereafter, the processor 105 ends the processing in the command execution module 111 (Step 707).

Subsequently, a procedure of adding the control code to the received stream data to create the stream tuple is described.

Figure 8:
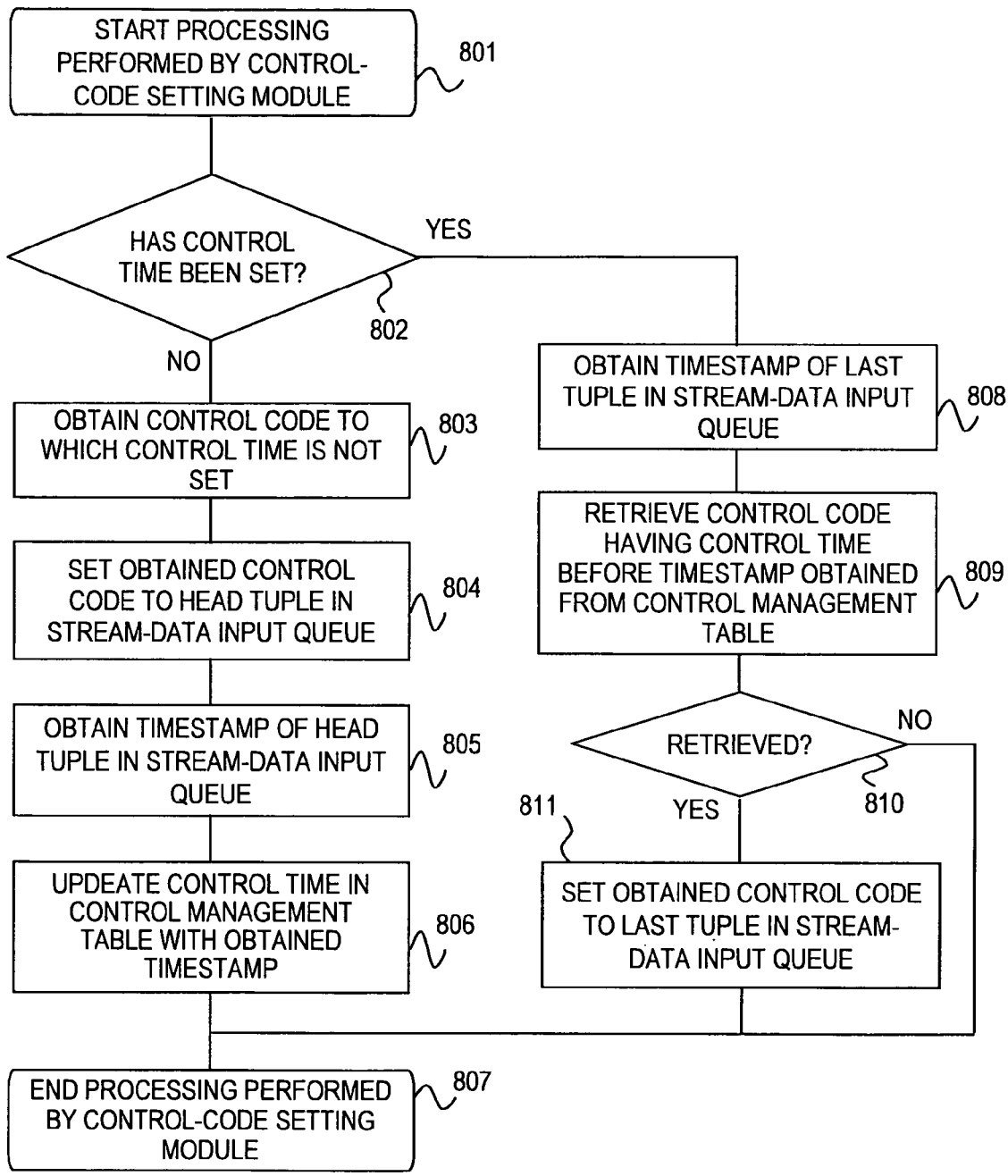
FIG. 8 is a flow chart illustrating the procedure of adding a control code to the stream data according to the embodiment of this invention.

FIG. 8 is a flow chart illustrating the procedure of adding the control code to the stream data according to the embodiment of this invention.

In this processing, through the execution of the control-code setting module 115 by the processor 105, the control code stored in the control management table 119 is added to the stream data so that the stream tuple 604 or the stream tuple 609 is created. This processing is executed, after the control management table 119 is created, with respect to the stream data stored in the stream-data input queue.

The processor 105 receives input of the command, starts the processing for the stream data, and then executes the control-code setting module 115 with respect to the received stream data (Step 801).

First, the processor 105 determines whether or not the control time 503 has been set to the control management table 119 (Step 802). The case where the control time 503 has not been set corresponds to the case where the command has been input without specifying a time as in the case with, e.g., the commands (402, 403, 404, and 405) illustrated in FIGS. 4B to 4E. Conversely, the case where the control time 503 has been set corresponds to the case with, e.g., each of the commands in the second and subsequent rows of the command 406 illustrated in FIG. 4F.

In the case where the control time 503 has not been set to the control management table 119 (when the result of Step 802 is "No"), the processor 105 obtains the control code 502 from the control management table 119 (Step 803).

The processor 105 sets the control code 502 obtained in the processing of Step 803 to the stream data stored in the head position of the stream-data input queue (Step 804).

Further, the processor 105 obtains the timestamp of the stream data stored in the head position of the stream-data input queue (Step 805). Then, the processor 105 updates the control time 503 in the control management table 119 with the timestamp obtained in the processing of Step 805 (Step 806), and ends this processing (Step 807).

Conversely, in the case where the control time 503 has been set to the control management table 119 (when the result of Step 802 is "Yes"), the processor 105 obtains the timestamp of the last stream data stored in the stream-data input queue (Step 808).

Further, the processor 105 retrieves the control code 502 having the control time 503 previous to the timestamp obtained in the processing of Step 808 from the control management table 119 (Step 809), and determines whether or not the control code 502 is present (Step 810).

When the control code 502 is present (when the result of Step 810 is "Yes"), the processor 105 sets the control code obtained in the processing of Step 809 to the last stream data stored in the stream-data input queue (Step 811).

In the case where the control code 502 is not present (when the result of Step 810 is "No"), or where the processing of Step 811 is ended, the processor 105 ends this processing (Step 807).

Figure 9:
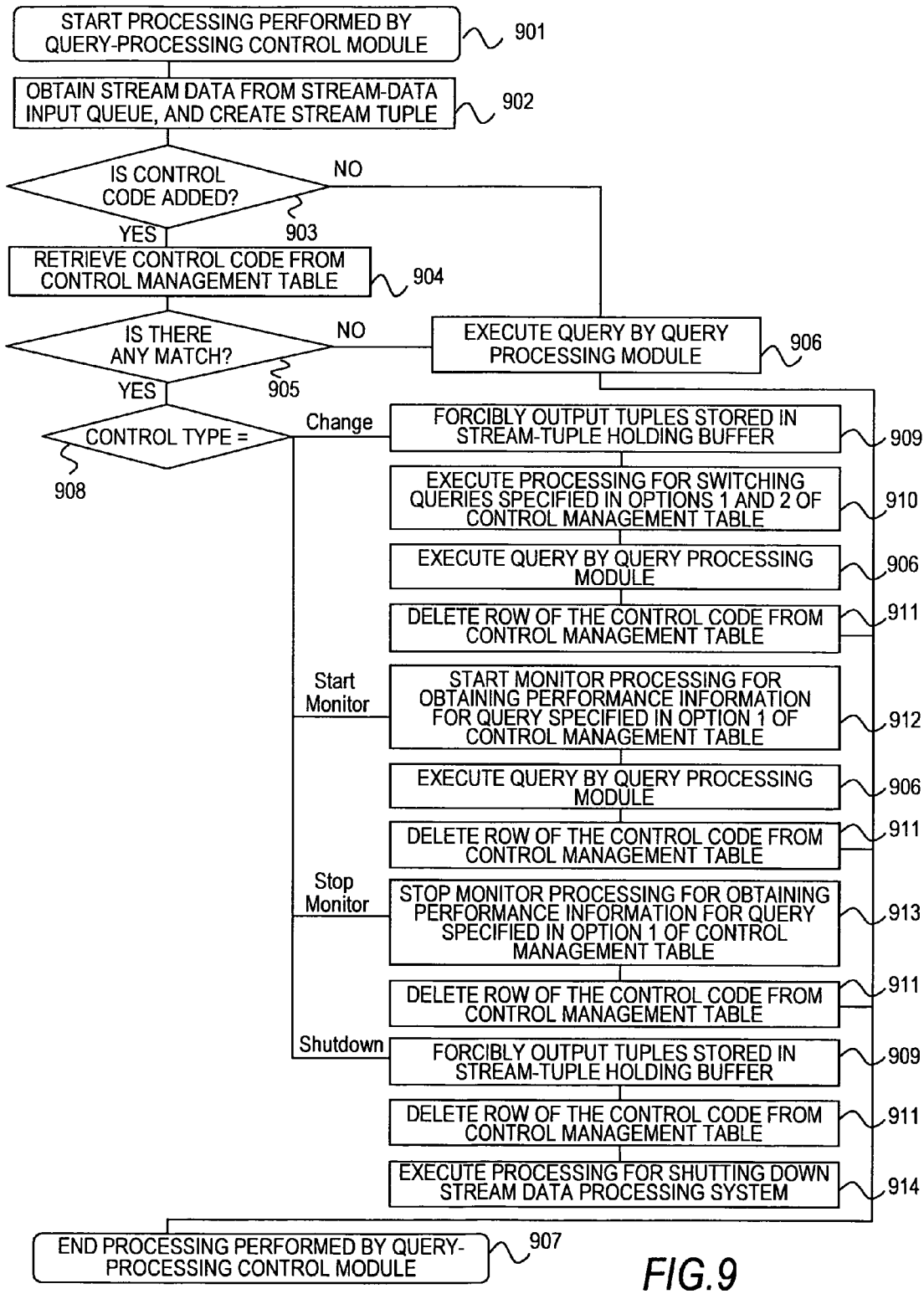
FIG. 9 is a flow chart illustrating a procedure of processing stream data and a procedure of controlling the stream data processing system according to the embodiment of this invention.

FIG. 9 is a flow chart illustrating a procedure of processing stream data and a procedure of controlling the stream data processing system according to the embodiment of this invention.

In this processing, through the execution of the query-processing control module 117 by the processor 105, the received stream data is processed. Further, based on the control code added to the stream tuple 604 or the stream tuple 609 and on the content of registration in the control management table 119, the processor 105 controls the stream data processing system.

When the stream data stored in the stream-data input queue shifts to a processible status, the processor 105 starts a processing performed by the query-processing control module 117 (Step 901).

The processor 105 obtains stream data from the stream-data input queue, and creates a stream tuple (Step 902). Further, the processor 105 determines whether or not the control code has been added to the created stream tuple (Step 903).

In the case where the control code has not been added to the stream tuple (when the result of Step 903 is "No"), the processor 105 executes the query by the query processing module 118 without executing a control processing (Step 906). When the execution of the query is ended, the processor 105 ends this processing (Step 907).

Conversely, in the case where the control code has been added to the stream tuple (when the result of Step 903 is "Yes"), the processor 105 searches the control management table 119 (Step 904) based on the added control code. Further, the processor 105 determines whether or not the corresponding control code has been retrieved from the control management table 119 (Step 905).

In the case where the control code has not been retrieved from the control management table 119 (when the result of Step 905 is "No"), the processor 105 executes the query in the query processing module 118 (Step 906). Specifically, in the case where the added control code is unknown, a normal query is executed in the same manner as in the case where the control code has not been added. After the execution of the query is ended, the processor 105 ends this processing (Step 907).

In the case where the control code has been retrieved from the control management table 119 (when the result of Step 905 is "Yes"), the processor 105 obtains the control type 504 corresponding to the control code from the control management table 119, and executes the corresponding processing (Step 908).

In the case where the value of the control type 504 is "Change", the processor 105 forcibly outputs the tuples held in the stream-tuple holding buffer 205 of the window manager 202 (Step 909). Further, the processor 105 executes a processing for switching the respective queries specified in the option 1 (505) and the option 2 (506) of the control management table 119 (Step 910). In the processing of Step 910, the processor 105 ends the execution of the query specified in the option 1 (505), and starts the execution of the query specified in the option 2 (506).

The processor 105 executes the query in the query processing module 118 (Step 906), and further deletes the row of the control code for which the control processing has been completed from the control management table 119 (Step 911). After ending the processing of Step 911, the processor 105 ends this processing (Step 907).

In the case where the value of the control type 504 is "Start Monitor", the processor 105 starts the monitor processing for obtaining performance information for the query specified in the option 1 (505) of the control management table 119 (Step 912).

The processor 105 executes the query in the query processing module 118 (Step 906), and deletes the row of the control code for which the control processing has been completed from the control management table 119 (Step 911). After ending the processing of Step 911, the processor 105 ends this processing (Step 907).

In the case where the value of the control type 504 is "Stop Monitor", the processor 105 stops the monitor processing for obtaining performance information for the query specified in the option 1 (505) of the control management table 119 (Step 913).

The processor 105 deletes the row of the control code for which the control processing has been completed from the control management table 119 (Step 911), and then ends this processing (Step 907).

In the case where the value of the control type 504 is "Shutdown", the processor 105 forcibly outputs the tuples held in the stream-tuple holding buffer 205 of the window manager 202 (Step 909). Further, the processor 105 deletes the row of the control code for which the control processing has been completed from the control management table 119 (Step 911), and then executes a processing for shutting down the stream data processing system (Step 914).

Figure 10:
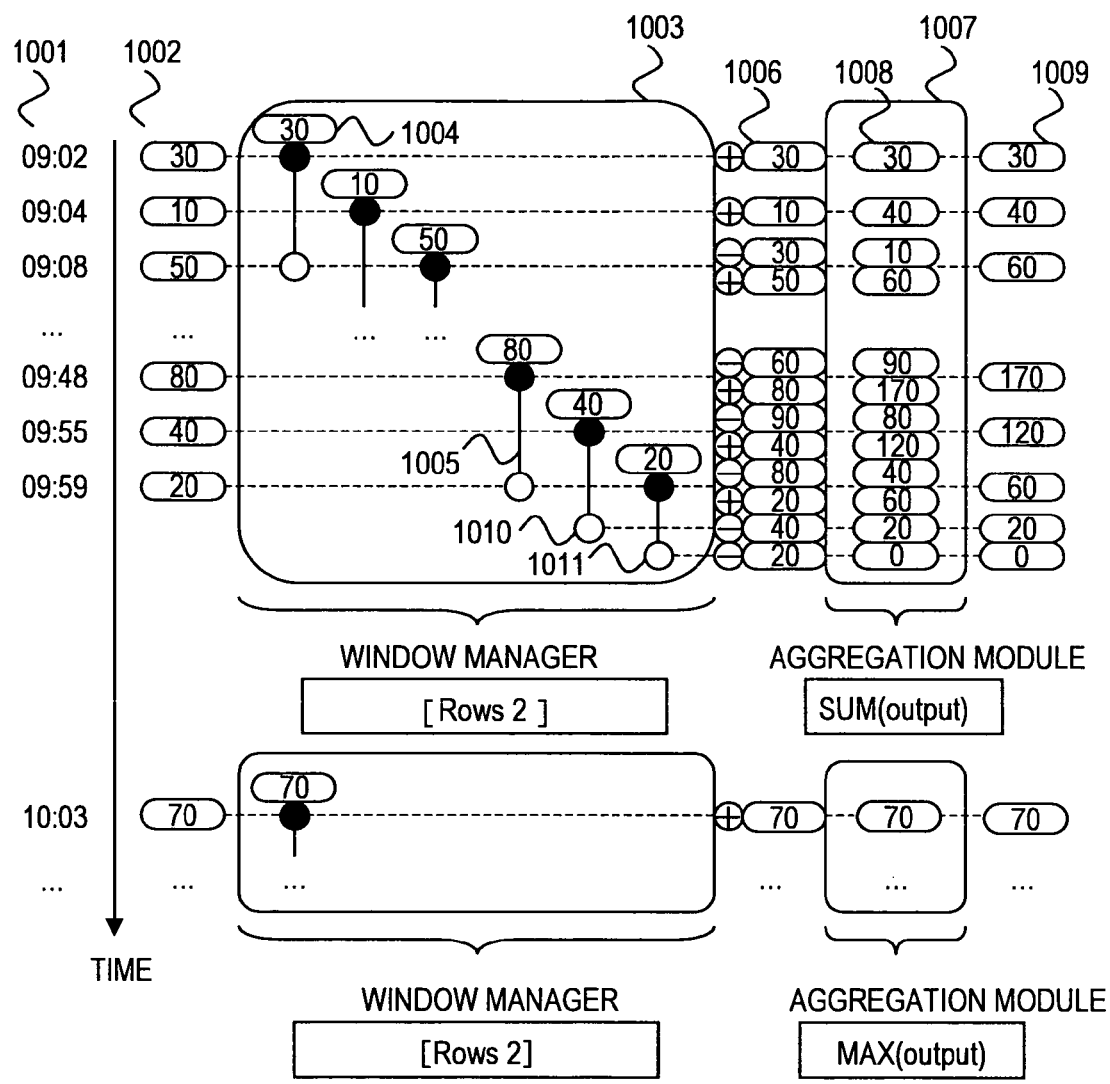
FIG. 10 is a diagram illustrating a flow of entire stream data processing system according to the embodiment of this invention.

Referring to FIG. 10, a description is given to a flow of the processing of the queries 301 and 302, the command 406, and the stream tuple 604 according to the foregoing procedure illustrated in FIGS. 7 to 9.

FIG. 10 is a diagram illustrating the flow of the entire stream data processing system according to the embodiment of this invention.

In the status illustrated in FIG. 10, through the registration of the query Q1 (301) and the query Q2 (302) in the query repository 120 and through the execution of the command 406, the execution of the query Q1 (301) has been started. In this status, as shown in the stream tuple 604, the server computer 101 receives the stream data.

FIG. 10 illustrates the processing of the stream data received by the server computer 101 which is executed with time according to each module using the coordinate axis as a time axis 1001.

According to the embodiment of this invention, it is assumed that the received stream data is in a form of {value}, and represented by an ellipsoid 1002. The time axis 1001 corresponds to the time period from the time 09:02 to the time 10:03, and represents the time at which each stream data is received by the stream data processing system 107. For example, it is shown that the stream data {30} and the stream data {10} were respectively received at the times 09:02 and 09:04 by the stream data processing system 107.

The abscissa axis in FIG. 10 represents the module in which the received stream data is processed, and created data. The rounded quadrilateral (1003) in the upper left part of FIG. 10 illustrates the status at each time of the stream-tuple holding buffer 205 in which the result of applying a window operation "[Rows 2]" to the stream data received by the system in the window manager 202 is stored.

On the other hand, the rounded quadrilateral (1007) in the upper right part illustrates the temporary storage buffer 209 in which the result of applying the summation operator 207 "SUM (Output)" to the stream tuple output from the window manager 202 is stored. In addition, the value (1008) stored at each time in the temporary storage buffer 209 is illustrated. The arithmetic processing specified using the value stored in the temporary storage buffer 209 is executed, and a processing result 1009 is output.

As described above, the window manager 202 creates the stream tuple by applying the window operation specified in the query to the received stream data, and sets the lifetime of the stream tuple in the system. In the example illustrated in FIG. 10, the starting time of the lifetime and the ending time thereof are respectively represented by the solid circle and the hollow circle (1005). Specifically, it is shown that the stream tuple {30} (1004) is created by applying the window operation to the stream data {30}, and the lifetime of the stream tuple {30} (1004) is from the time 09:02 to the time 09:08.

According to the embodiment of this invention, at the starting time of the lifetime of the stream tuple, a tuple obtained by adding a sign representing an increment to the stream data (hereinafter referred to as the "plus tuple") is created within the system. In the case where the stream data is deleted from the window, a tuple which has a reference to the previously output plus tuple, and is added with a sign representing a decrement (hereinafter referred to as the "minus tuple") is created. The created plus tuple and minus tuple are illustrated in 1006 of FIG. 10. The foregoing processing is executed by the window manager 202.

In the example illustrated in FIG. 10, the plus tuple {+}{30} corresponding to the stream data {30} is created at the time 09:02, and the corresponding minus tuple {-}{30} is created at the time 09:08.

The subsequent-stage query processing subsequent to the window operation is executed with respect to differential information which is created based on the plus tuple and the minus tuple at the time at which the plus tuple and the minus tuple are output. The notion of the plus tuple and the minus tuple is described in R. Motwani, J. Widom, A. Arasu, B. Babcock, S. Babu, M. Datar, G. Manku, C. Olston, J. Rosenstein, and R. Varma, "Query Processing, Resource Management, and Approximation in a Data Stream Management System", In Proc. of the 2003 Conf. on Innovative Data Systems Research (CIDR), January 2003 described above.

On receiving the stream data {70} to which the control code 1 (Change) has been added, the processor 105 sequentially outputs the stream tuples held in the stream-tuple holding buffer 205 in response to a notification from the query-processing control module 117 to complete the processing for the query Q1. In FIG. 10, the tuples {40} (1010) and {20} (1011) are output. Then, based on the contents of registration in the options 1 and 2 corresponding to the control code 1 in the control management table 119, the currently executed query is switched. Specifically, switching from the query Q1 to the query Q2 is performed.

The curved quadrilateral in the lower left part of FIG. 10 illustrates the status at each time of the stream-tuple holding buffer 205 after the query switching. Specifically, the result of applying the window operation "[Rows 2]" to the stream data received by the system in the window manager 202 for the query Q2 is stored.

On the other hand, the rounded quadrilateral in the lower right part illustrates the status at each time of the temporary storage buffer 209 which stores therein the result of applying the maximum-value calculation operator 208 "MAX (Output)" to the stream tuple output from the window manager 202 after the query switching, i.e., in the query Q2.

Figure 11:
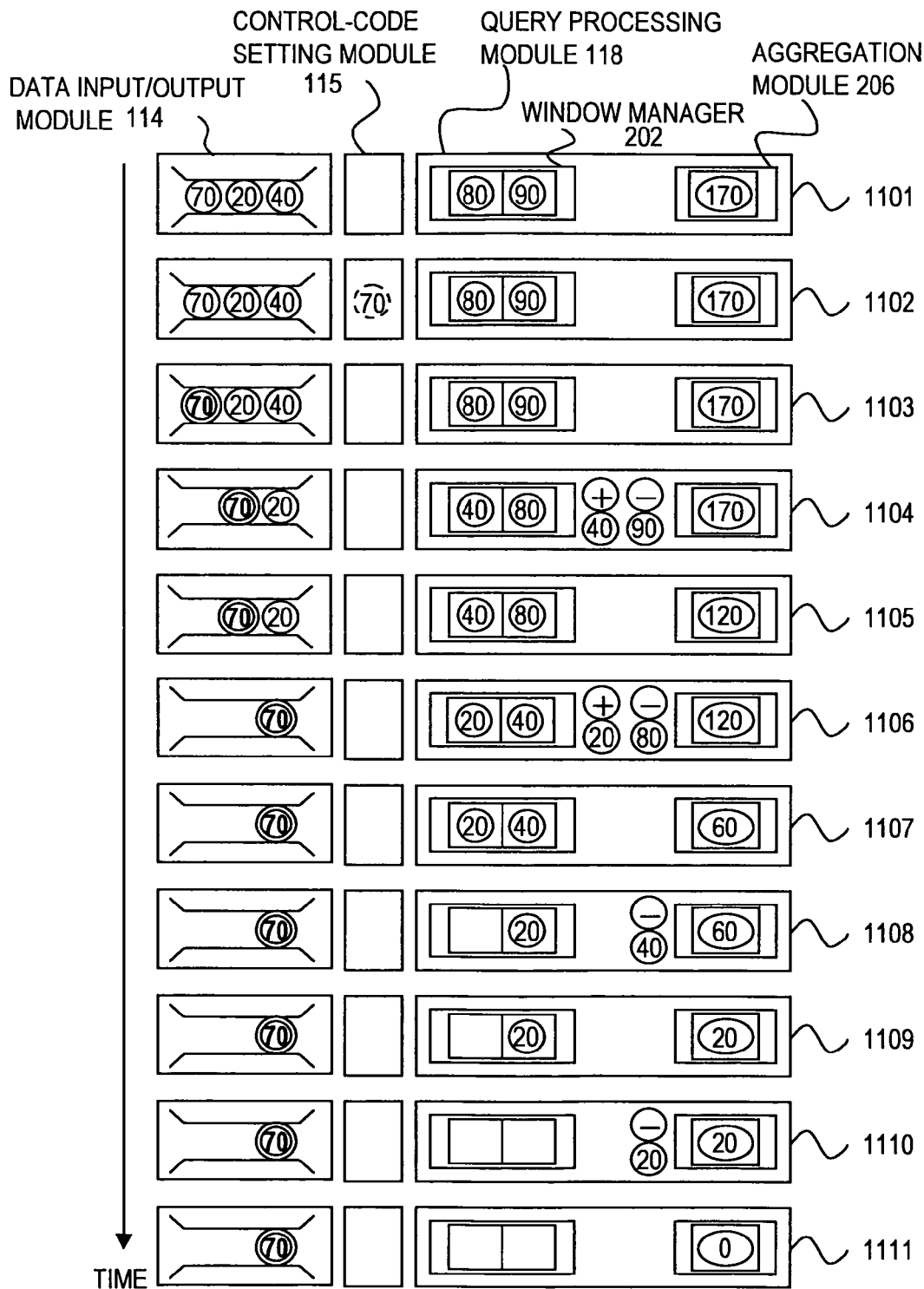
FIG. 11 is a diagram illustrating the status of the stream data processed in a data input/output module, the control-code setting module, and the query processing module of the stream data processing system according to the embodiment of this invention.

FIG. 11 is a diagram illustrating the status of the stream data processed in the data input/output module 114, the control-code setting module 115, and the query processing module 118 of the stream data processing system 107 according to the embodiment of this invention.

The query processing module 118 illustrated in FIG. 11 includes the window manager 202, and the aggregation module 206 in the same manner as in FIG. 10.

In a status 1101, the stream data having a value of 70 which has been received upon the query switching is stored in the input queue of the data input/output module 114.

In a status 1102, it is determined, when new data is stored in the input queue of the data input/output module 114, whether or not the control code is to be set by the control-code setting module 115. In FIG. 11, the case is assumed where a control time is unset.

In a status 1103, the control code has been added to the stream data having a value of 70 which has been received upon the query switching as a result of the processing by the control-code setting module 115. The stream data to which the control code has been added is represented by a double circle.

Statuses 1104 to 1106 show the case where the stream data has been retrieved from the input queue, and the control code has not been added to the retrieved stream data.

In a status 1107, the stream data to which the control code has been set is processed. In the case of processing the stream data with the control code, the query-processing control module 117 controls the query processing module 118 based on the procedure illustrated in FIG. 9. In the example illustrated in FIG. 11, the control code in which the control type for the query switching is "Change" has been added, and hence the processing of Step 909 is executed. The stream tuples held in the stream-tuple holding buffer 205 of the window managers 202 are forcibly output.

In statuses 1108 to 1111, the forcibly output stream tuples are sequentially processed.

Figure 12:
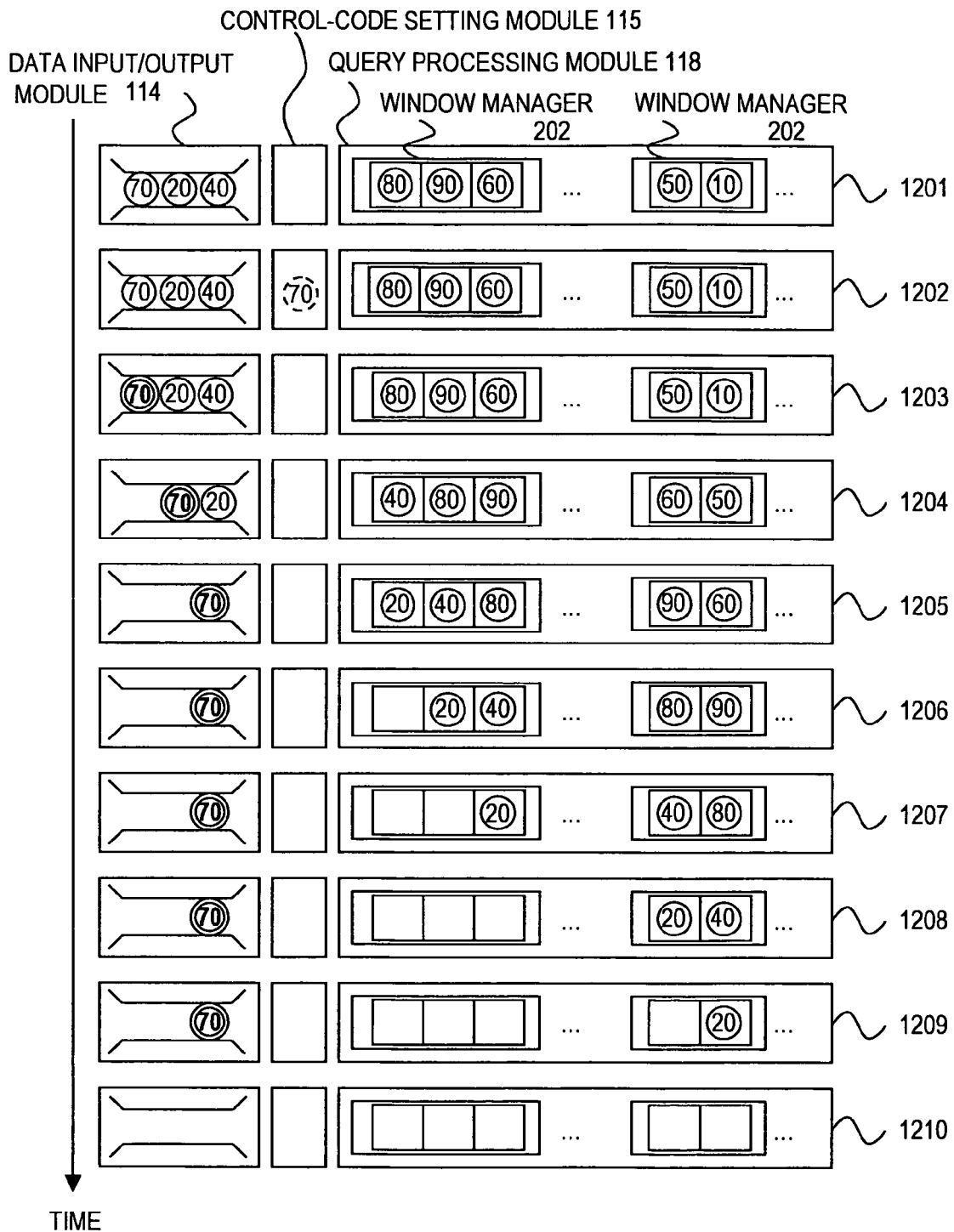
FIG. 12 is a diagram illustrating the status of the stream data processed in the stream data processing system according to the embodiment of this invention, and also illustrating the case where a plurality of the windows are coupled.

FIG. 12 is a diagram illustrating the status of the stream data processed in the stream data processing system 107 according to the embodiment of this invention, and also illustrating the case where a plurality of the windows are coupled.

In FIG. 12, an example is illustrated in which the query processing module 118 includes a plurality of the window managers 202 coupled to each other.

In a status. 1201, the stream data having a value of 70 which has been received upon the query switching is stored in the input queue of the data input/output module 114, in the same manner as in the status 1101 of FIG. 11.

In a status 1202, it is determined, when new data is stored in the input queue of the data input/output module 114, whether or not the control code is to be set by the control-code setting module 115, in the same manner as in the status 1102 of FIG. 11. In FIG. 12, the case is assumed where a control time is unset in the same manner as in FIG. 11.

In a status 1203, the control code has been added to the stream data having a value of 70 which has been received upon the query switching as a result of the processing by the control-code setting module 115, in the same manner as in the status 1103 of FIG. 11. In the same manner as in FIG. 11, the stream data to which the control code has been added is represented by a double circle.

A status 1204 shows the case where the stream data has been retrieved from the input queue, and the control code has not been added to the retrieved stream data.

In a status 1205, the stream data to which the control code has been set is processed. In the case of processing the stream data with the control code, the query-processing control module 117 controls the query processing module 118 based on the procedure illustrated in FIG. 9. In the example illustrated in FIG. 12, the control code in which the control type for the query switching is "Change" has been added in the same manner as in FIG. 11, and hence the processing of Step 909 is executed. As illustrated in FIG. 12, in the case where control includes a plurality of the window operations, the stream tuples stored in the stream-tuple holding buffer 205 are output in the order in which the window managers 202 are coupled.

In statuses 1206 to 1210, the forcibly output stream tuples are sequentially processed.

Thus, according to the embodiment of this invention, the control code is added to the stream data and, based on the added control code, the stream data processing can be controlled.

In the embodiment described above, the control code is added to the stream data received with the timing which triggers the switching of processings. However, it is also possible to use a special tuple containing only a control code instead of adding the control code to the stream data. Hereinbelow, a description is given of variations of the embodiment of this invention using special tuples.

FIG. 13A is a diagram illustrating an example of a stream tuple 1301 processed by the stream data processing system 107 according to the variation of the embodiment of this invention.

FIG. 13A illustrates an example of the system timestamp mode in which a timestamp is added to stream data at the time at which the stream data is received by the stream data processing system 107. Basically, the stream tuple 1301 is the same as the stream tuple 604 illustrated in FIG. 6B, but is different in that a special tuple (1302) to which only a control code has been set is contained therein.

FIG. 13B is a diagram illustrating an example of a stream tuple 1303 processed by the stream data processing system 107 according to the variation of the embodiment of this invention.

FIG. 13B illustrates an example of the application timestamp mode in which a timestamp is added to stream data by the application 1 (127) on the client computer 1 (126). Basically, the stream tuple 1303 is the same as the stream tuple 609 illustrated in FIG. 6C, but is different in that a special tuple (1304) to which only the control code has been set is contained therein.

Hereinbelow, a description is given of a procedure of controlling the stream data processing system 107 using the special tuple.

Figure 14:
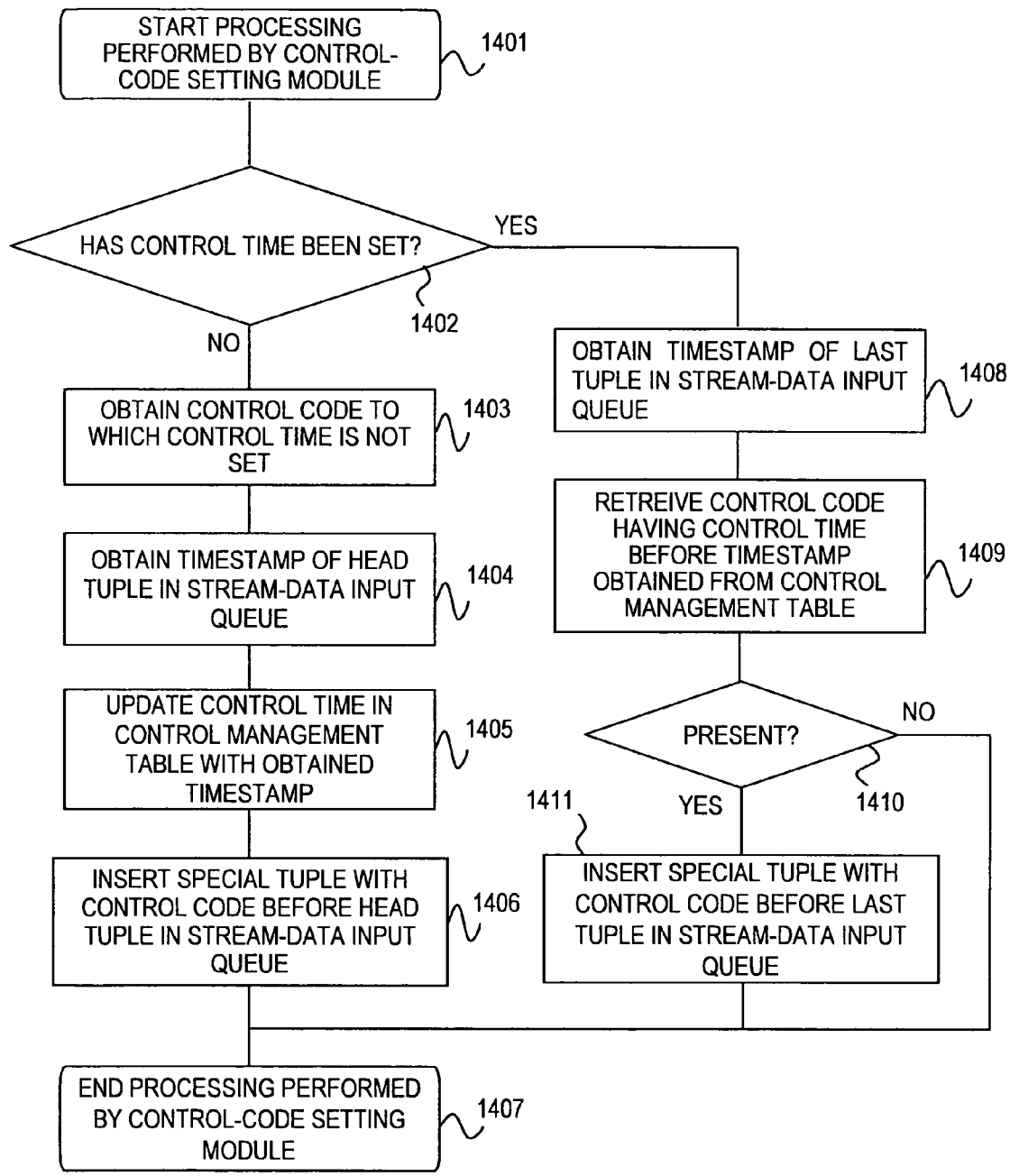
FIG. 14 is a flow chart illustrating a procedure of inserting a special tuple containing the control code into the stream-data input queue according to the variation of the embodiment of this invention.

FIG. 14 is a flow chart illustrating a procedure of inserting the special tuple containing the control code into the stream-data input queue according to the variation of the embodiment of this invention.

In this processing, by executing the control-code setting module 115, the processor 105 creates the special tuple containing the control code stored in the control management table 119, and inserts the created special tuple into the stream-data input queue. Through this processing, based on the control management table 119, the stream tuple 1301 or the stream tuple 1303 is created.

When a command is input, and the control management table 119 illustrated in FIG. 7 is created, the processor 105 executes the control-code setting module 115 with respect to the received stream data (Step 1401).

First, the processor 105 determines whether or not the control time 503 has been set to the control management table 119 (Step 1402). The case where the control time 503 has not been set corresponds to the case where the command has been input without specifying a time as in the case with, e.g., the commands (402, 403, 404, and 405) illustrated in FIGS. 4B to 4E. Conversely, the case where the control time 503 has been set corresponds to the case with, e.g., each of the commands in the second and subsequent rows of the command 406 illustrated in FIG. 4F.

In the case where the control time 503 has not been set to the control management table 119 (when the result of Step 1402 is "No"), the processor 105 obtains the control code 502 from the control management table 119 (Step 1403).

The processor 105 obtains the timestamp from the stream data stored in the head position of the stream-data input queue (Step 1404). Further, the processor 105 updates the control time 503 in the control management table 119 based on the timestamp obtained in the processing of Step 1404 (Step 1405).

The processor 105 inserts the special tuple containing the control code which has been obtained in the processing of Step 1403 into a position before the stream data stored in the head position of the stream-data input queue (Step 1406), and ends this processing (Step 1407).

Conversely, in the case where the control time 503 has been set to the control management table 119 (when the result of Step 1402 is "Yes"), the processor 105 obtains the timestamp of the last stream tuple stored in the stream-data input queue (Step 1408).

Further, the processor 105 retrieves the control code 502 having the control time 503 previous to the timestamp obtained in the processing of Step 1408 (Step 1409), and determines whether or not the control code 502 is present (Step 1410).

In the case where the control code 502 is present (when the result of Step 1410 is "Yes"), the processor 105 inserts the special tuple containing the control code obtained in the processing of Step 1409 into a position before the last stream data stored in the stream-data input queue (Step 1411), and ends this processing (Step 1407).

Figure 15:
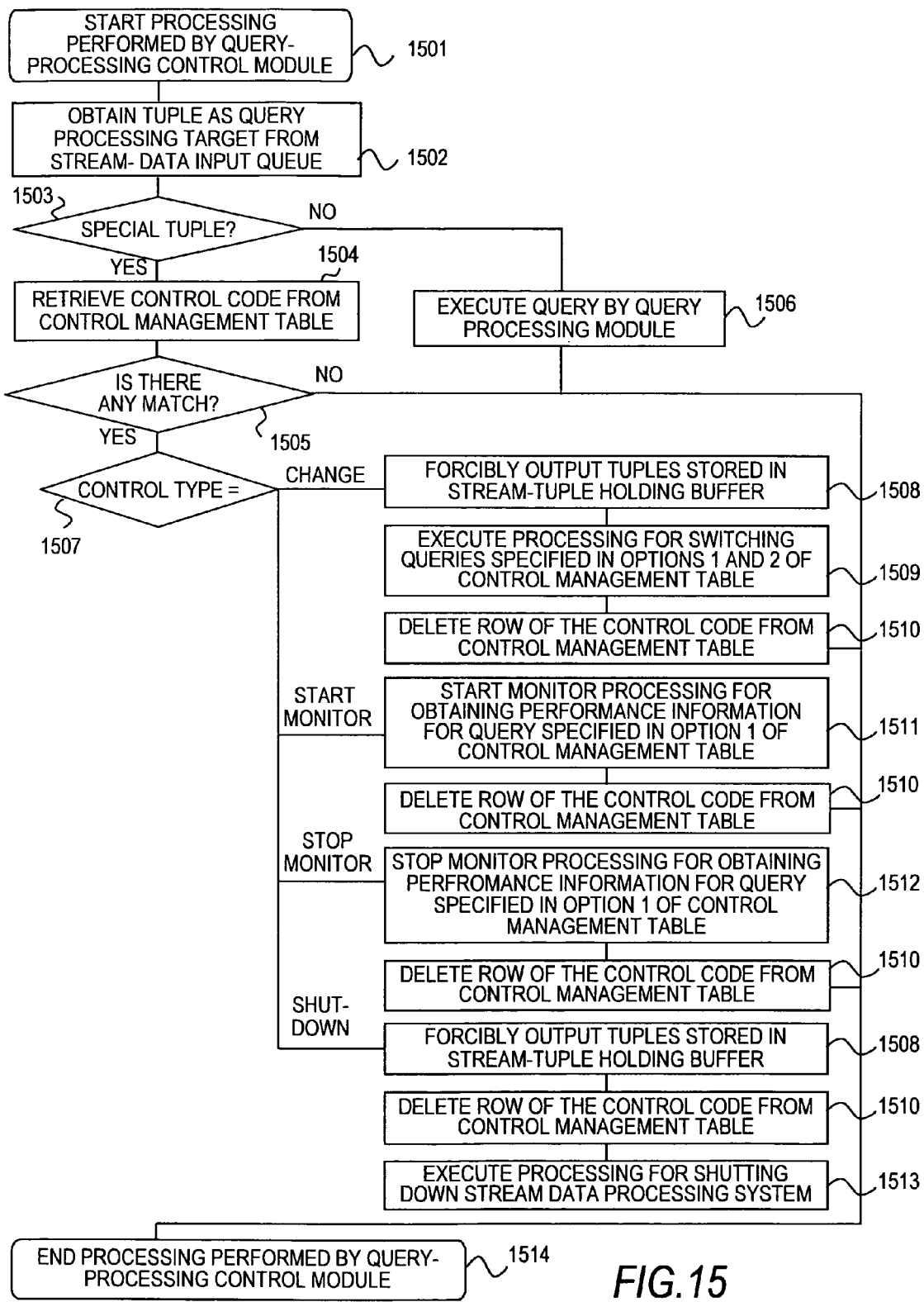
FIG. 15 is a flow chart illustrating a procedure of processing stream data according to the variation of the embodiment of this invention, and a procedure of controlling the stream data processing system.

FIG. 15 is a flow chart illustrating a procedure of processing stream data according to the variation of the embodiment of this invention, and a procedure of controlling the stream data processing system.

In this processing, by executing the query-processing control module 117, the processor 105 processes the stream data. Further, based on the control code added to the stream tuple 1301 or the stream tuple 1303 and on the content of registration in the control management table 119, the processor 105 controls the stream data processing system.

When the stream data stored in the stream-data input queue shifts to a processible status, the processor 105 starts the processing performed by the query-processing control module 117 (Step 1501).

From the stream-data input queue, the processor 105 obtains the stream data as a processing target or the special tuple with the control code (Step 1502). Further, the processor 105 determines whether or not the special tuple with the control code has been obtained (Step 1503).

In the case where the special tuple with the control code has not been obtained, i.e., when the stream data has been obtained (when the result of Step 1503 is "No"), the processor 105 executes a normal query processing by the query processing module 118 (Step 1506), and ends this processing (Step 1514).

Conversely, in the case where the special tuple with the control code has been obtained (when the result of Step 1503 is "Yes"), the processor 105 searches the control management table 119 based on the control code added to the special tuple (Step 1504). Further, the processor 105 determines whether or not the corresponding control code has been retrieved from the control management table 119 (Step 1505).

In the case where the control code has not been retrieved from the control management table 119 (when the result of Step 1505 is "No"), the processor 105 ends this processing (Step 1514).

In the case where the control code has been retrieved from the control management table 119 (when the result of Step 1505 is "Yes"), the processor 105 obtains the control type 504 corresponding to the control code from the control management table 119, and executes the corresponding processing (Step 1507).

In the case where the value of the control type 504 is "Change", the processor 105 forcibly outputs the tuples held in the stream-tuple holding buffer 205 of the window manager 202 (Step 1508). Further, the processor 105 executes the processing for switching the queries specified in the option 1 (505) and the option 2 (506) of the control management table 119 (Step 1509). In the processing of Step 1509, the processor 105 ends the execution of the query specified in the option 1 (505), and executes the query specified in the option 2 (506).

The processor 105 deletes the row of the control code for which the control processing has been completed from the control management table 119 (Step 1510), and ends this processing (Step 1514).

In the case where the value of the control type 504 is "Start Monitor", the processor 105 starts the monitor processing for obtaining performance information for the query specified in the option 1 (505) of the control management table 119 (Step 1511).

The processor 105 deletes the row of the control code for which the control processing has been completed from the control management table 119 (Step 1510), and ends this processing (Step 1514).

In the case where the value of the control type 504 is "Stop Monitor", the processor 105 stops the monitor processing for obtaining performance information for the query specified in the option 1 (505) of the control management table 119 (Step 1512).

The processor 105 deletes the row of the control code for which the control processing has been completed from the control management table 119 (Step 1510), and ends this processing (Step 1514).

In the case where the value of the control type 504 is "Shutdown", the processor 105 forcibly outputs the tuples held in the stream-tuple holding buffer 205 of the window manager 202 (Step 1508). Further, the processor 105 deletes the row of the control code for which the control processing has been completed from the control management table 119 (Step 1510), and then executes a processing for shutting down the stream data processing system (Step 1513).

According to the embodiment of this invention, in the stream data processing system which processes a large amount of data arriving continuously in real time, data serving as a delimiter can be specified by referring to stream data. As a result, it becomes possible to control, based on the input stream data, a processing for the stream data, and to provide a basis for a data processing which is controllable with a real-time application.

According to the embodiment of this invention, instead of adding the control code to all the stream data items in a specified time period, the control code is added only to the stream data item which triggers the switching of the processings. Accordingly, an overhead for processing the stream data can be minimized.

According to the embodiment of this invention, the control code is added to the stream data according to the input command. Therefore, the stream data processing system is allowed to complete the processing without requiring a processing for adding an identifier to data in the stream data source or the like.

According to the embodiment of this invention, it becomes possible to perform a control operation such as the ending of the system upon arrival of specified data. This allows such a management operation in which, after the processing is completed at a specified time, the system is ended.

According to the variations of the embodiment of this invention, the received stream data is not processed. This allows a conventional arithmetic operator to be used without any alteration. Accordingly, by adding minimum modules required for applying this invention to a conventional stream data processing system or by changing the conventional stream data processing system, the use of the query processing module 118 or the like can be continued.

While the present invention has been described in detail and pictorially in the accompanying drawings, the present invention is not limited to such detail but covers various obvious modifications and equivalent arrangements, which fall within the purview of the appended claims.

What is claimed is:

1. A stream data processing control method of controlling a stream data processing apparatus for receiving data added with time information in time series, and processing the data with a registered query therein,
the stream data processing apparatus comprising:
an interface for receiving the data;
a processor coupled to the interface; and
a memory device coupled to the processor, for storing therein the query for processing the data, a window in which the received data is stored in a case where the received data is processed by the query, and control management information including a content of the controlling of the stream data processing apparatus and a control code for identifying the content of the controlling,
the stream data processing control method including the steps of:
creating, by the stream data processing apparatus, data including the control code based on the control management information in a case where the data is received;

determining, by the stream data processing apparatus, whether or not the data stored in the window includes the control code in a case where the received data is stored in the window; and controlling the stream data processing apparatus based on the control code included in the data if the data stored in the window includes the control code.

2. The stream data processing control method according to claim 1, wherein:

the control management information further includes time information on a time when the controlling is executed;

the time information is added to the data; and the data including the control code is created based on the time information added to the received data and on the control management information.

3. The stream data processing control method according to claim 2, further including the steps of:

receiving, by the stream data processing apparatus, input of a command for controlling the stream data processing apparatus; and creating, by the stream data processing apparatus, the control management information based on the received command.

4. The stream data processing control method according to claim 3, further includes the step of setting, by the stream data processing apparatus, in a case where the received command includes time information on a time when the controlling is executed, the time information included in the control management information based on time information included in the command.

5. The stream data processing control method according to claim 3, further includes the step of setting, by the stream data processing apparatus, time information included in the control management information based on time information added to latest data that has been received by the stream data processing apparatus and has not been stored in the window in a case where the received command does not include the time information on a time when the controlling is executed.

6. The stream data processing control method according to claim 2, wherein the data is added with a time at which the data is received by the stream data processing apparatus as the time information.

7. The stream data processing control method according to claim 2, wherein the time information is added to the data by a source of the data.

8. The stream data processing control method according to claim 1, wherein the data including the control code is created by adding the control code to the received data.

9. The stream data processing control method according to claim 1, wherein the data including the control code is newly created by the stream data processing apparatus separately from the received data.

10. The stream data processing control method according to claim 1, further includes the step of controlling the stream data processing apparatus to switch the query currently executed by the stream data processing apparatus to another query.

11. The stream data processing control method according to claim 1, further includes the step of controlling the stream data processing apparatus to execute a monitor processing for obtaining performance for the query currently executed by the stream data processing apparatus.

12. The stream data processing control method according to claim 1, further includes the step of controlling the stream data processing apparatus to execute a processing for stopping the stream data processing apparatus.

13. A stream data processing apparatus for receiving data added with time information in time series, and processing the data with a registered query therein, the stream data processing apparatus comprising:

an interface for receiving the data;

a processor coupled to the interface; and a memory device coupled to the processor, for storing therein the query for processing the data, a window in which the received data is stored in a case where the received data is processed by the query, and control management information including a content of the controlling of the stream data processing apparatus and a control code for identifying the content of the controlling, wherein the processor is configured to:

create data including the control code based on the control management information in a case where the stream data processing apparatus receives the data;

determine whether or not the data stored in the window includes the control code in a case where the received data is stored in the window; and control the stream data processing apparatus based on the control code included in the data in a case where the data stored in the window includes the control code.

14. A storage medium recorded with a stream data processing control program executed by a stream data processing apparatus for receiving data added with time information in time series, and processing the data with a registered query therein, the stream data processing apparatus storing therein control management information including a content of control over the stream data processing apparatus and a control code corresponding to the content of the control, the stream data processing control program including the steps of:

creating a window in which the data is stored in a case where the data is processed by the query;

creating data including the control code based on the control management information in a case where the data is received;

determining whether or not the data stored in the window includes the control code; and controlling the stream data processing apparatus based on the control code included in the data stored in the window in a case where the data stored in the window includes the control code.

* * * * *